Nov. 20, 1934.   L. H. BRINKMAN   1,981,777
PIPE COUPLING
Filed Oct. 20, 1931
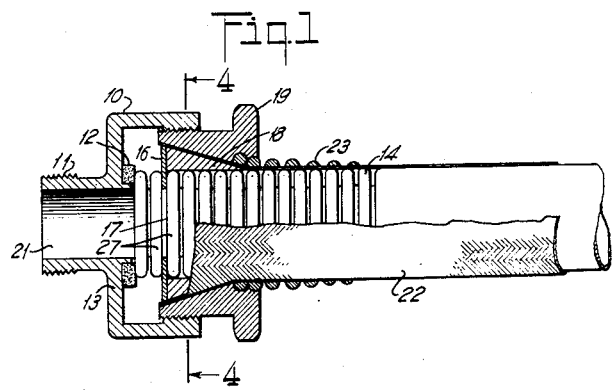
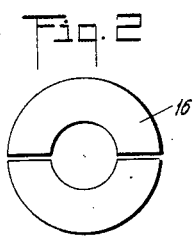
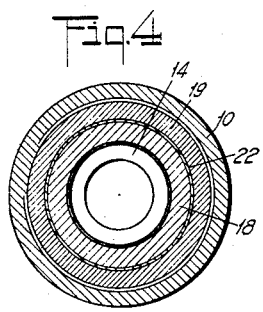
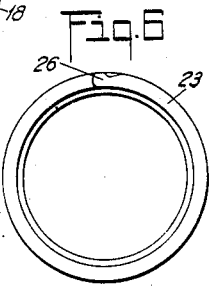
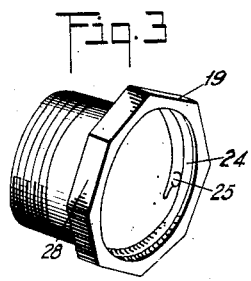
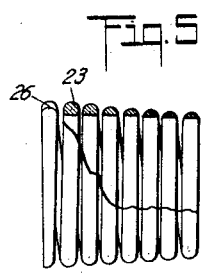
INVENTOR
*Louis H. Brinkman.*
BY
*F. B. Smith*
ATTORNEY Patented Nov. 20, 1934

1,981,777

UNITED STATES PATENT OFFICE 1,981,777

PIPE COUPLING

Louis H. Brinkman, Glen Ridge, N. J.

Application October 20, 1931, Serial No. 570,004

12 Claims. (Cl. 285—72)

This invention relates to couplings, and more particularly to couplings for flexible pipes.

An object of the invention is to provide an improved detachable coupling for a pipe or fluid conduit.

Another object of the invention is to provide a detachable coupling that is adapted for use with a corrugated pipe or conduit.

Another object of the invention is to provide a detachable coupling for a flexible pipe that prevents localized flexure of the pipe adjacent the coupling.

Another object of the invention is to provide a pipe coupling that also serves as a securing means for a protective pipe covering.

Another object of the invention is to provide a coupling that is readily removable from the pipe after disassembly.

Other objects of the invention will appear from the following description, in connection with which a preferred embodiment of the invention has been illustrated in the accompanying drawing, in which:

Fig. 1 is an elevational view partly in section of the improved coupling;

Fig. 2 is a view of the segmental washer which is used as a thrust member for engaging a corrugated pipe;

Fig. 3 is a perspective view of the threaded fitting;

Fig. 4 is a sectional view taken on the line 4—4 of Fig. 1;

Fig. 5 is a view partly in section of the pipe support; and,

Fig. 6 is an end view of the support shown in Fig. 5.

In the drawing, the body portion 10 of the coupling has a threaded extension 11 adapted to be secured to any desired operative part, such as a hydraulic vehicle brake, not shown, and is provided with an inward extension 12 for locating a gasket 13, against which the end of corrugated pipe 14 is clamped. A segmental washer or disc 16 is disposed in one of the annular grooves 17 of pipe 14 and projects outwardly therefrom in position to be engaged by the conical sleeve 18 that has its inner bore approximately the same as the external dimension of pipe 14. A fitting 19 having a threaded engagement with body portion 10 is provided with an inner complementary bore corresponding to the external conical surface of sleeve 18 and is adapted to force the sleeve toward the body portion 10, whereby the sleeve 18 engages the segmental disc 16 and clamps pipe 14 against the gasket 12 to form a fluid-tight seat and enable fluid pressure to be transmitted from the pipe 14 to the opening 21 of extension 11.

In the embodiment shown, pipe 14 is provided with a protective covering 22 that has its end portion disposed between the contiguous faces of sleeve 18 and fitting 19, whereby tightening of the fitting 19 clamps the protective covering between the conical members when the component parts are in their assembled relation, as shown in Fig. 1. In cases wherein the pipe 14 is subjected to vibration or to flexure, a support 23 may be secured to fitting 19, which is preferably formed of a helical coil of any desired material, such as spring steel, which may be threaded into groove 24 having a depression 25 adapted to receive projection 26 on the inner end of the helical spring for permanently holding it in position. Support 23 is preferably formed of a wire having a decreased cross-sectional area as the distance from the fitting 19 is increased, whereby the resistance against flexure toward the outer end of the support 23 is decreased and the danger of localized flexure of pipe 14 adjacent the coupling is eliminated.

In the assembly of the coupling, support 23 is first threaded into the fitting 19 and the parts are slipped over the outside of pipe 14 and the protective covering 22. Sleeve 18 is placed over the outer end of pipe 14 and protective covering 22 is drawn over its external conical surface. Segmental washers 16 are placed in the annular groove 17 formed by adjacent pipe corrugations 27, and the assembly is inserted in the body portion 10, and fitting 19 screwed into position by means of polygonal surfaces 28 that are adapted to be engaged by a wrench. Tightening of the fitting 19 clamps the pipe 14 against gasket 13 and pinches the protective covering 22 between the conical surfaces of the members 18 and 19.

While a preferred embodiment of the invention has been illustrated and described, it is understood that this showing and description are illustrative only and that the invention is not regarded as limited to the form shown and described, or otherwise, except by the terms of the following claims:

What is claimed is:

1. In a coupling for a pipe having an annular shoulder, a body portion, a member having a conical aperture slidable on the pipe having a threaded connection with the body portion, a segmental disc engaging the shoulder and projecting beyond the same, and a conical sleeve slidable on the pipe adapted to be forced inwardly by the conical portion of the threaded member to engage the disc and clamp the pipe to the body portion.

2. In a coupling for a pipe having a circumferential shoulder, a body portion, a member having a conical aperture slidable on the pipe having a threaded connection with the body portion, a segmental disc engaging the shoulder and projecting beyond the same, a conical sleeve slidable on the pipe adapted to be forced inwardly by the conical portion of the threaded member to engage the disc and clamp the pipe to the body portion, and means on the coupling for resiliently supporting the pipe against localized flexure adjacent the coupling.

3. In a coupling for a pipe having an annular groove adjacent its end, a body portion having a seat, a segmental disc positioned in the groove, a sleeve on the pipe engaging the washer, means for forcing the sleeve against the disc to clamp the pipe to the body portion seat, and means releasably secured to the coupling for resiliently supporting the pipe against localized flexure adjacent the coupling.

4. In a coupling for a pipe having parallel corrugations and a covering, a body portion, a split member inserted in the corrugations and adapted to force the pipe against the body portion, a fitting coacting with the body portion to force the member toward the body, a sleeve slidable on the pipe and abutting the member, said fitting and sleeve having contiguous portions adapted to clamp the covering therebetween, and resilient means removably secured to the fitting for resisting flexing of the pipe and covering adjacent the fitting.

5. In a coupling for a pipe having parallel corrugations and a covering, a body portion, a split member inserted in the corrugations and adapted to force the pipe against the body portion, a fitting coacting with the body portion to force the member toward the body a slidable sleeve abutting the split member, said fitting and sleeve having complementary conical portions adapted to clamp the covering therebetween, and resilient means removably secured to the fitting for resisting flexing of the pipe and covering adjacent the fitting.

6. In a coupling for a pipe having an annular circumferential groove, a segmental disc within the groove, a body portion, a conical sleeve engaging the disc, and a fitting threaded to the body portion having a conical bore adapted to engage the conical sleeve for clamping the pipe to the body portion.

7. In a coupling for a pipe having an annular circumferential groove, a segmental disc within the groove, a body portion, a conical sleeve engaging the disc, a fitting threaded to the body portion having a conical bore adapted to engage the conical sleeve for clamping the pipe to the body portion, and a wire helix secured to the coupling for supporting the pipe, the wire having a diminishing cross-sectional area as the distance from the coupling increases.

8. In a coupling for a pipe having an annular groove adjacent its end, a body portion having a seat, a segmental disc positioned in the groove, a member on the pipe engaging the disc, and means for forcing the member against the disc in an axial direction to clamp the pipe to the body portion seat.

9. In a coupling, a pipe having parallel corrugations, a body portion having a shoulder, a split disc within the corrugations, a fitting threaded to the body portion, and means movable with the fitting toward the body portion, said means having a face abutting the faces of the disc segments to move the same to clamp the pipe against the shoulder.

10. In a coupling, a pipe having parallel corrugations, a body portion having a shoulder, a split disc within the corrugations, a fitting threaded to the body portion, and a sleeve slidable on the pipe and movable with the fitting toward the body portion, said means having a face abutting the faces of the disc segments to move the same to clamp the pipe against the shoulder.

11. In a coupling, a pipe having parallel corrugations, a body portion having a shoulder, a split disc within the corrugations adjacent the end of the pipe, a sleeve having a face abutting the faces of the disc segments to move the same toward the body portion, and means coacting with the body portion to move the sleeve to clamp the pipe against the shoulder.

12. In a coupling, a pipe having parallel corrugations, a body portion having a shoulder, a split disc within the corrugations adjacent the end of the pipe, a sleeve having a face abutting the faces of the disc segments to move the same toward the body portion, and a nut having a threaded connection with the body portion and contacting the sleeve to move the same to clamp the pipe against the shoulder.

LOUIS H. BRINKMAN.